United States Patent [19]

Kaminski et al.

[11] Patent Number: 4,808,366
[45] Date of Patent: Feb. 28, 1989

[54] IN-MOLD LABELING OF INJECTION BLOW MOLDED HOLLOW PLASTIC ARTICLES

[75] Inventors: Ronald S. Kaminski, Bowling Green; William F. Sido; Casimir W. Nowicki, both of Sylvania, all of Ohio

[73] Assignee: Owens-Illinois Plastic Products Inc., Toledo, Ohio

[21] Appl. No.: 103,313

[22] Filed: Oct. 1, 1987

[51] Int. Cl.$^4$ .................. B29C 49/06; B29C 49/24
[52] U.S. Cl. .......................... 264/509; 156/245; 156/285; 156/497; 156/500; 425/504; 425/522; 425/535; 425/538; 425/541; 425/588; 425/589; 425/126.1
[58] Field of Search .............. 156/245, 285, 500, 497; 264/509; 425/126 R, 504, 522, 523, 535, 538, 541, 542, 588, 589

[56] References Cited

U.S. PATENT DOCUMENTS

| | | | |
|---|---|---|---|
| 4,437,825 | 3/1984 | Harry et al. | 425/541 |
| 4,549,863 | 10/1985 | Bourgeois | 425/522 |
| 4,721,451 | 1/1988 | Darr | 425/504 |

Primary Examiner—Caleb Weston

[57] ABSTRACT

A method and apparatus for placement of labels within the blow molds of an injection blow molding machine. The injection blow molding machine comprising a turret having plurality of circumferentially spaced surfaces, each of which supports a plurality of spaced core rods, a plurality of injection molds at an injection molding station for forming a plurality of preforms, and a plurality of blow mold sections at a blow molding station which close about the preforms so that the preforms can be blown outwardly against the confines of the mold to form hollow plastic articles. The blow molds include movable bases exposing the interior of the blow molds when the blow molds are closed about preforms on the core rods. A positioning apparatus positions a plurality of labels at the blowing station and a plurality of cylindrical vacuum mandrels are rotated to pick-up the labels and thereafter the mandrels are translated to deliver the labels to the blow molds through the open bottoms after which the mandrels are retracted, the mold bottoms are closed and the hollow articles are blown in the molds with the labels on the outer surfaces thereof.

13 Claims, 16 Drawing Sheets

IN-MOLD LABELING OF INJECTION BLOW MOLDED HOLLOW PLASTIC ARTICLES

This invention relates to injection blow molding apparatus for blowing hollow plastic articles and particularly to such an apparatus wherein in-mold labels can be applied to the hollow articles as they are blown.

BACKGROUND AND SUMMARY OF THE INVENTION

One common type of machine for blow molding hollow articles is known as an injection blow molding machine wherein a core rod is inserted successively into an injection mold to form a preform or parison and is thereafter used to transfer the parison to a blow mold where the parison is blown outwardly against the confines of the mold to form hollow plastic article such as a container.

In one type of injection blow molding machine, a turret has a plurality of circumferentially spaced surfaces, for example, three surfaces, each of which supports a plurality of spaced core rods. When the turret is rotated, the core rods are moved successively first to a preform or injection station having an array of preform or parison molds, then to a blow molding station having an array of blow molds where the parisons are blown to form the hollow articles, and finally to an unload station where the hollow articles are removed from the core rods permitting a new cycle to begin.

In various blow molding machines, it has heretofore been suggested that labels be positioned in the hollow blow molds before blowing the hollow article so that the final article has a label applied to the exterior surface thereof. Insofar as is known, in-mold labeling in injection blow molding machines has not been achieved.

Accordingly, among the objectives of the present invention are to provide a method and apparatus for in-mold labeling in an injection blow molding machine wherein the in-mold labeling can be achieved without reducing the normal operating cycle and wherein the labels can be accurately positioned both longitudinally and circumferentially with respect to the parting line of the blow molds.

In accordance with the invention, a positioning apparatus positions a plurality of labels at the blow station adjacent each of the blow molds and a plurality of cylindrical vacuum mandrels rotate to pick-up the labels and are then translated to transfer the labels into the open bottoms of the molds. The mandrels are then retracted and the bottom plates of the molds are closed and the hollow articles are blown outwardly by expanding the parisons resulting in the hollow articles with the labels on the exterior surfaces thereof.

DESCRIPTION

Figure 1:
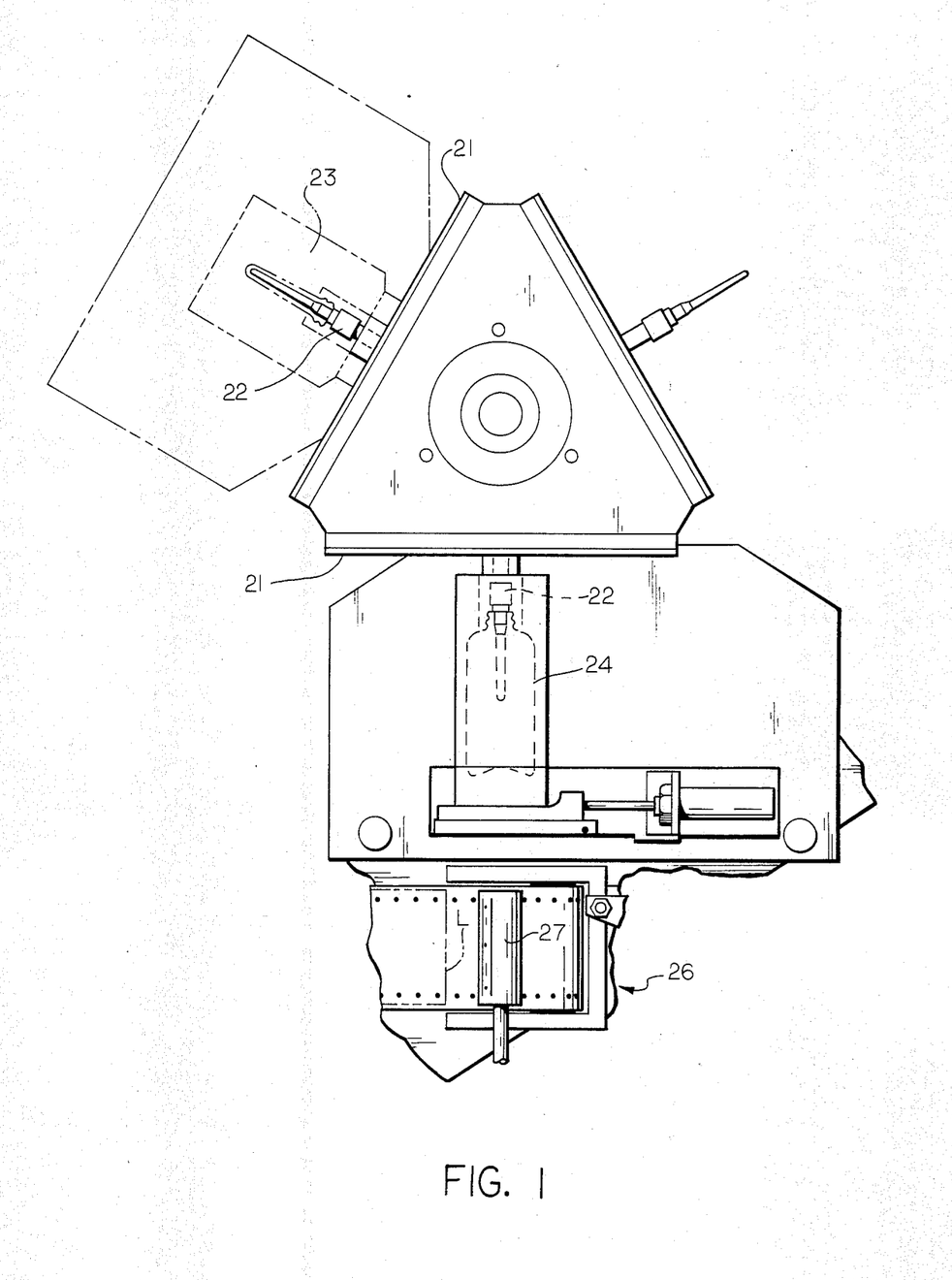
FIG. 1 is a partly diagrammatic plan view of an injection blow molding machine embodying the invention.

Referring to FIG. 1, the injection blow molding machine includes a turret 20 that has three circumferentially spaced surfaces 21, each of which supports a plurality of spaced core rods 22. The turret 20 is rotated in counterclockwise direction bringing the core rods 22 to a first preformed station A having an array of parison molds 23, where the parisons P are injection molded, then to a blow mold station B having an array of blow molds 24 where the parisons are blown to form the hollow articles, and finally, to a station C where the hollow articles are removed from the core rods permitting a new cycle to begin.

Figure 2:
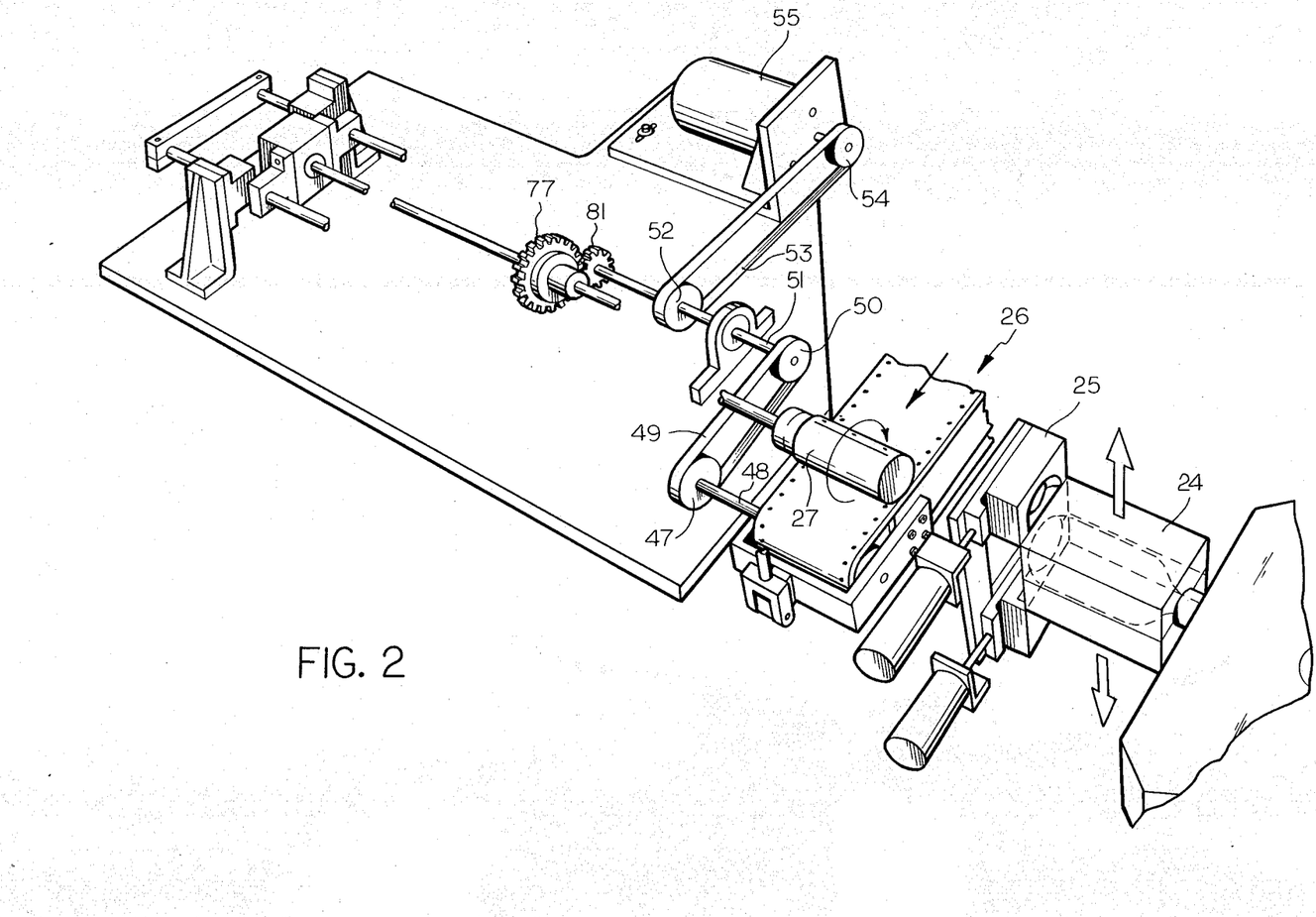
FIG. 2 is a fragmentary perspective view of a portion of the apparatus.
Figure 3:
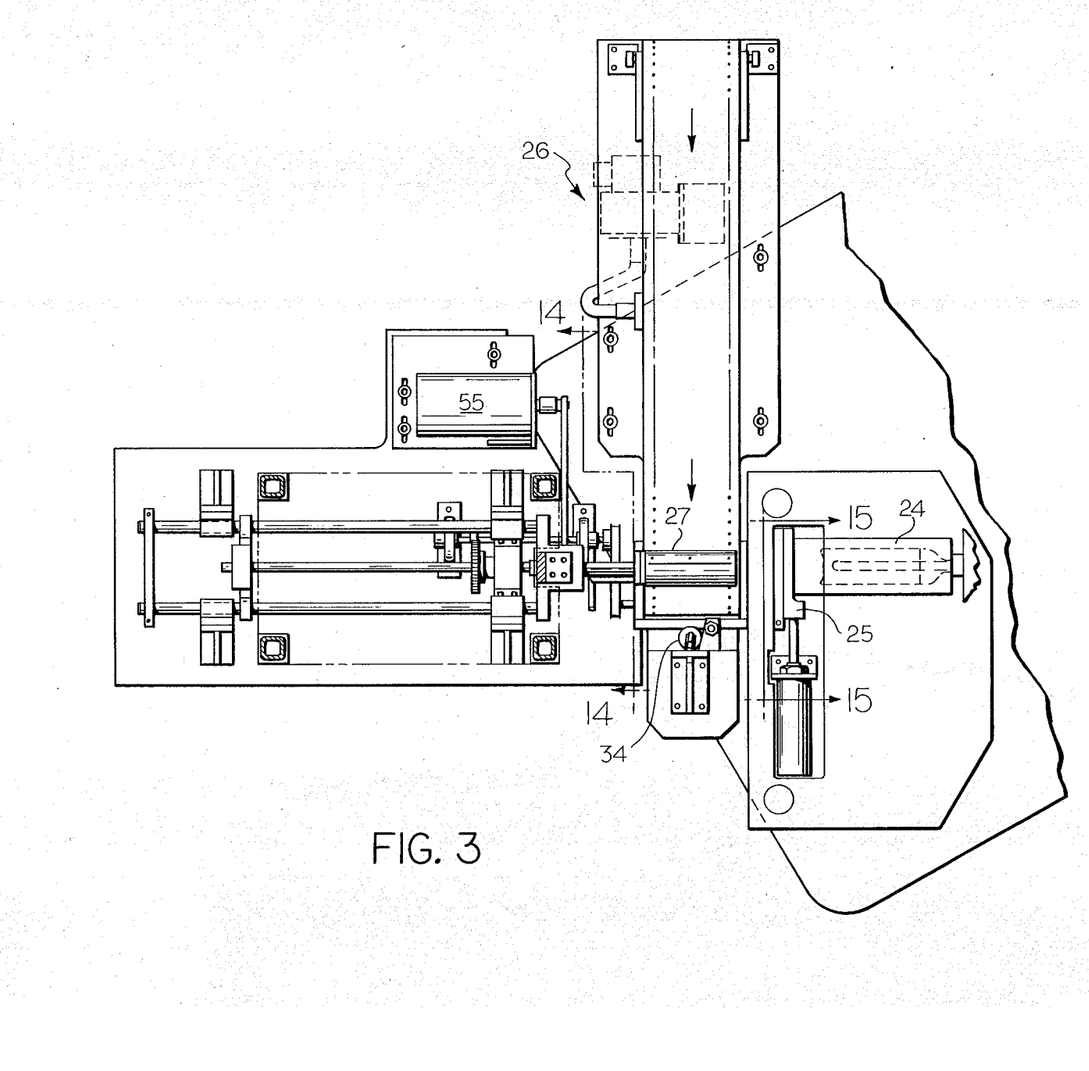
FIG. 3 is a fragmentary plan view of a portion of the apparatus.
Figure 4:
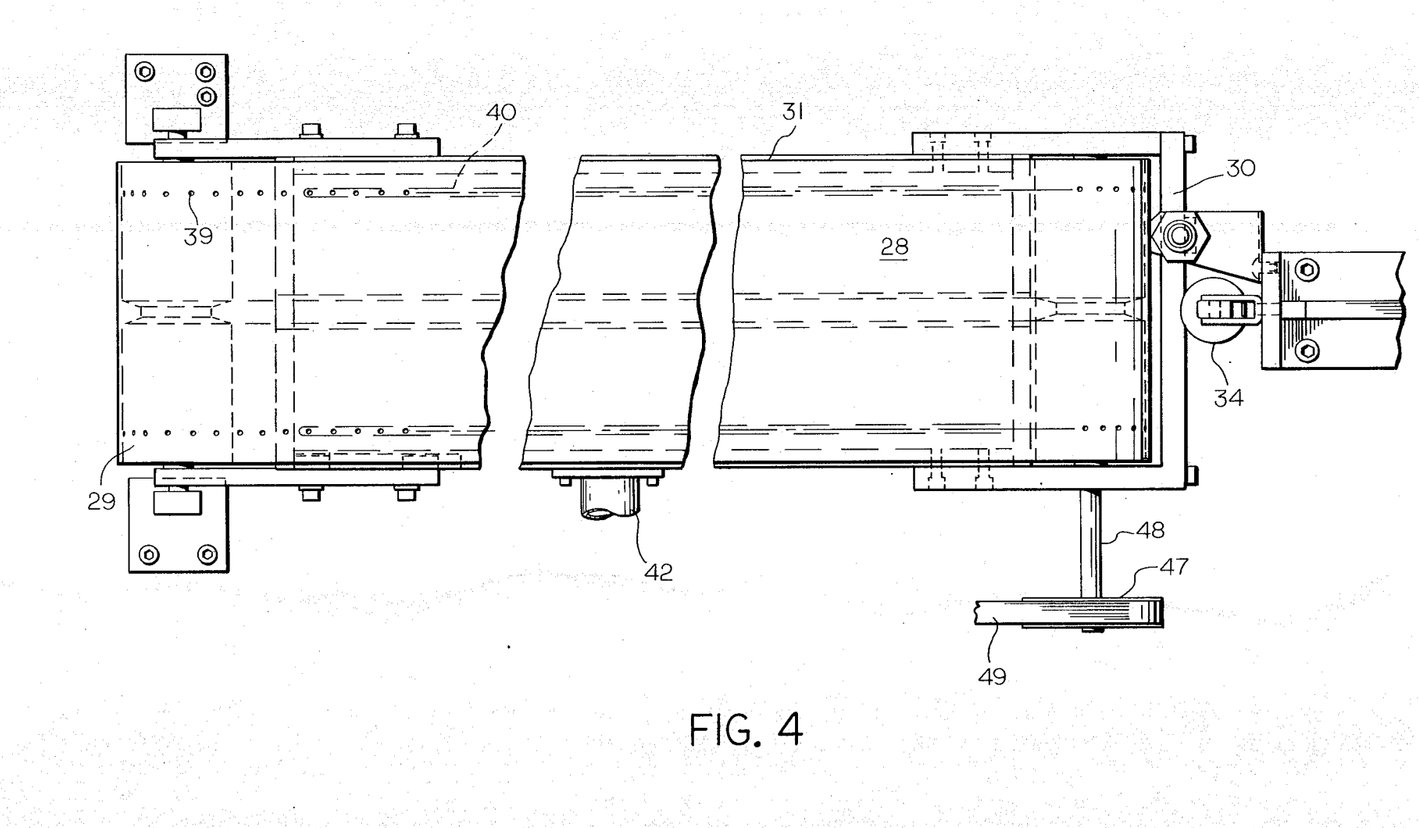
FIG. 4 is a fragmentary plan view of a portion of the apparatus on an enlarged scale.
Figure 5:
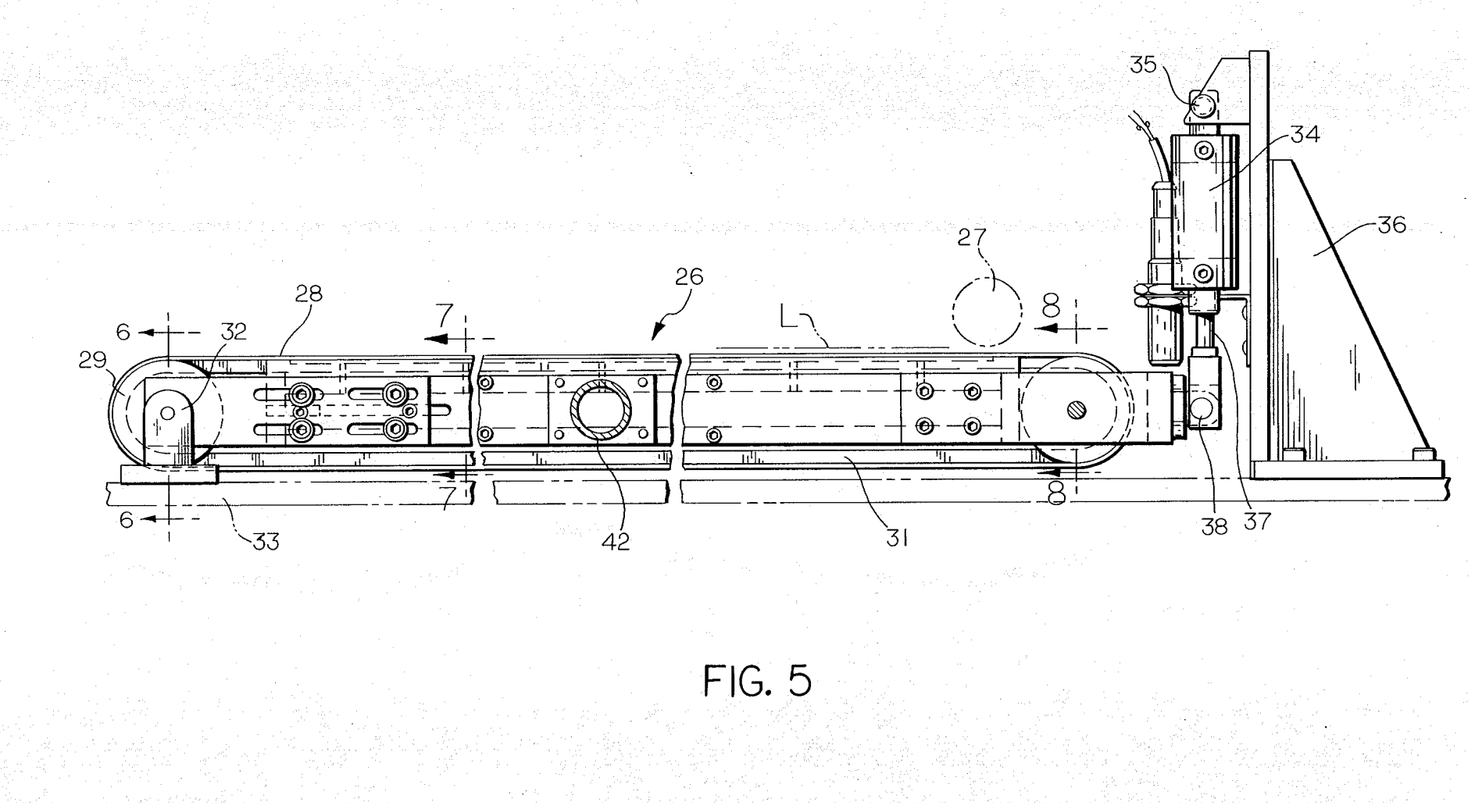
FIG. 5 is a fragmentary elevational view of the portion of the apparatus shown in FIG. 4.
Figure 6:
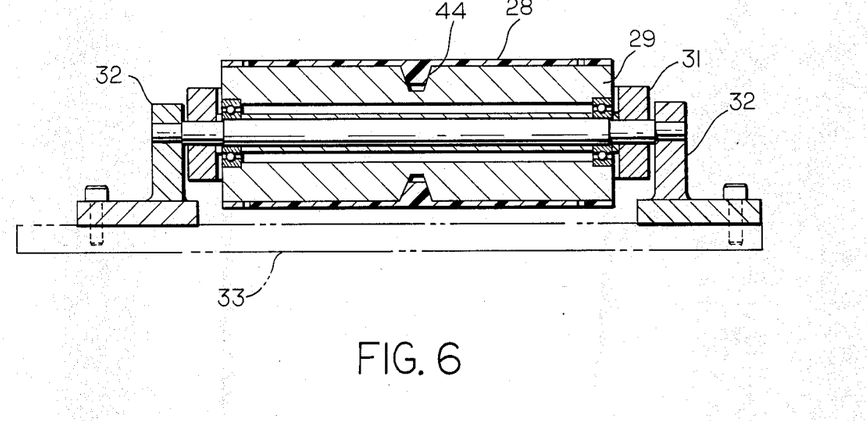
FIG. 6 is a fragmentary sectional view taken along the line 6—6 in FIG. 5.
Figure 7:
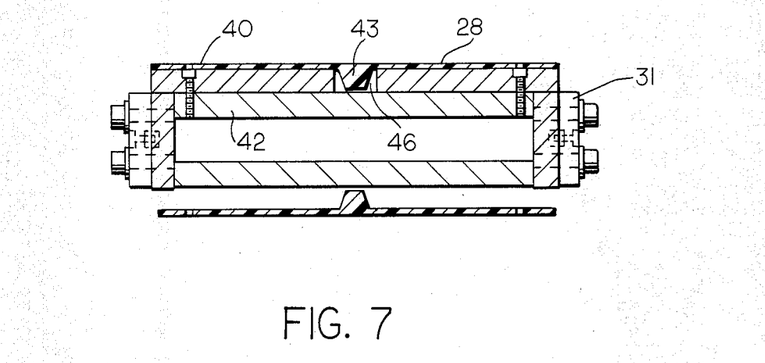
FIG. 7 is a fragmentary sectional view taken along the line 7—7 in FIG. 5.
Figure 8:
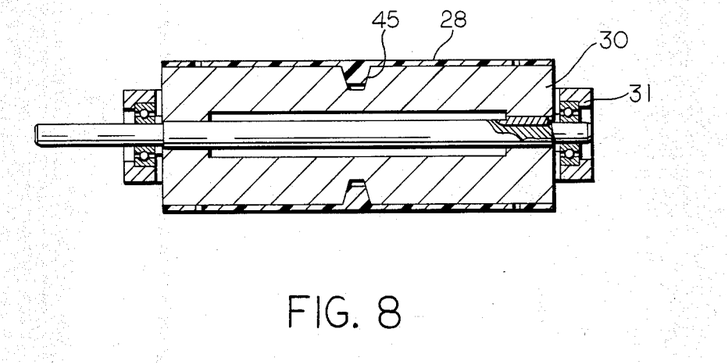
FIG. 8 is a fragmentary sectional view taken along the line 8—8 in FIG. 5.
Figure 18:
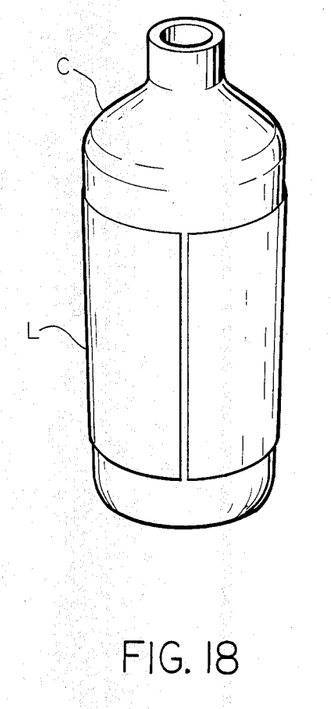
FIG. 18 is a perspective view of a container with a label applied thereto utilizing the apparatus of the present invention.
Figure 19:
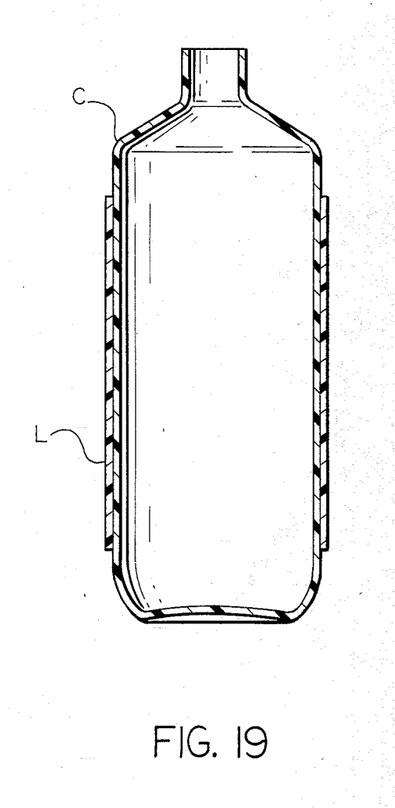
FIG. 19 is a longitudinal sectional view of a container shown in FIG. 18.

Referring to FIGS. 1-3, in accordance with the invention, the blow molds 24 are formed with movable bottom plates 25 to expose the interior of the molds 24 after they have been closed about the cores 12. In addition, a positioning device 26 positions a plurality of labels, one adjacent each blow mold 24. Cylindrical vacuum mandrels 27 are brought into position and rotated to pick-up the labels from the positioning device 26. The cylindrical mandrels 27 with the labels thereon are thereafter translated axially to deliver the labels through the open bottoms of the molds 24 and thereafter are retracted after which the base plates 25 are closed permitting the hollow articles to be blown outwardly and resulting in hollow articles which have a label thereon, in the manner shown in FIG. 18.

For purposes of clarity, only one of the blow molds 24 and associated mandrels 27 is shown and described in the following description and associated drawings. Each of the mandrels 27 has a drive and each of the blow molds 24 has associated bottom plates.

Referring to FIGS. 4–8, the positioning apparatus 26 comprises an endless vacuum belt 28 which is trained over pulleys 29, 30 mounted in a frame 31 that is pivoted at one end to supports 32 mounted on a plate 33. A cylinder 34 has its body pivoted as at 35 to an upright 36 mounted on the plate 33 and has its piston rod 37 pivoted as at 38 to the frame 31 so that the vacuum belt can be moved upwardly at the right end as viewed in FIG. 5 into position for registering with the vacuum mandrel 27. The vacuum belt 28 is provided with longitudinally spaced holes 39 which register with openings 41 of a vacuum manifold 42 that extends along the upper reach of the belt 28 between the pulleys 29, 30. The manifold is supported within the frame 31 and is supplied with vacuum through a connection 42. The belt 28 is provided with a longitudinally extending rib 43 that registers with grooves 44, 45 in the pulleys and a space 46 in the manifold. Pulley 30 is driven by a pulley 47 on the shaft 48 thereof which in turn is connected by a belt 49, pulley 50, shaft 51 and pulley 52, belt 53 and pulley 54 driven by motor 55 on a plate 56. The vacuum belt 28 is driven intermittently to bring a plurality of labels thereon in a position adjacent the blow molds.

Figures 9, 10:
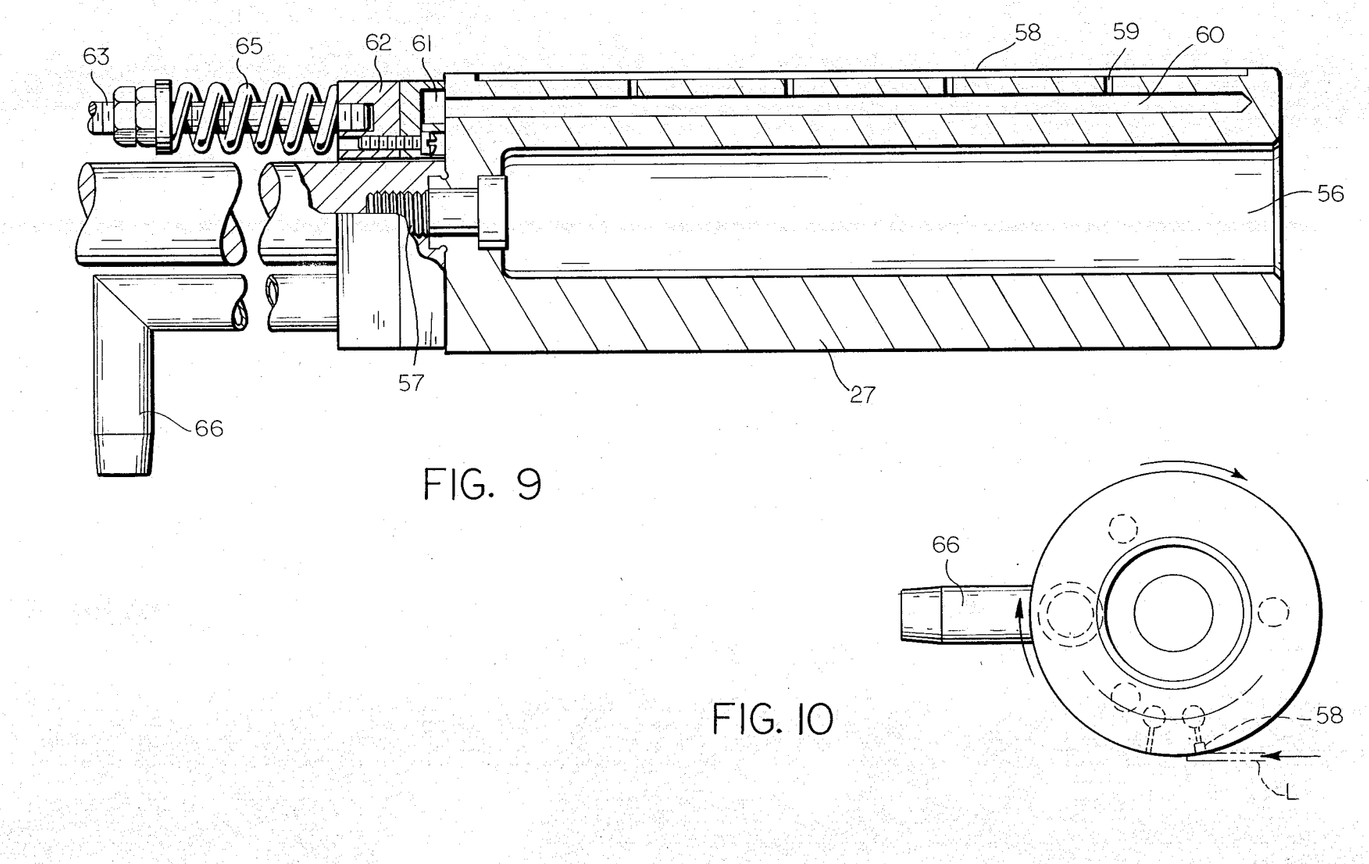
FIG. 9 is a part sectional view of the vacuum mandrel utilized in the apparatus.
FIG. 10 is a partly diagrammatic end view of the vacuum mandrel.
Figure 11:
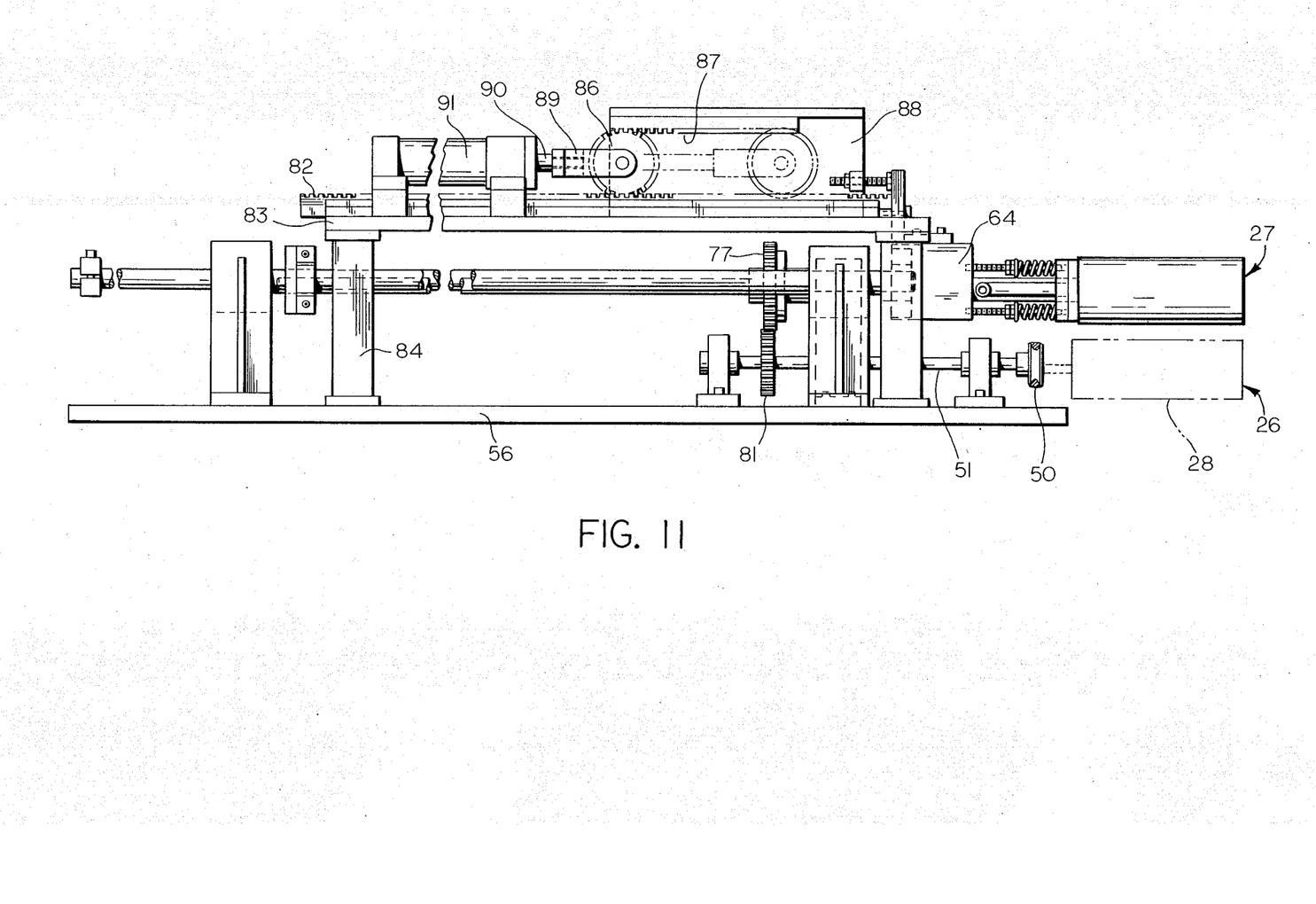
FIG. 11 is a fragmentary elevational view of a portion of the apparatus shown in FIG. 3.
Figure 12:
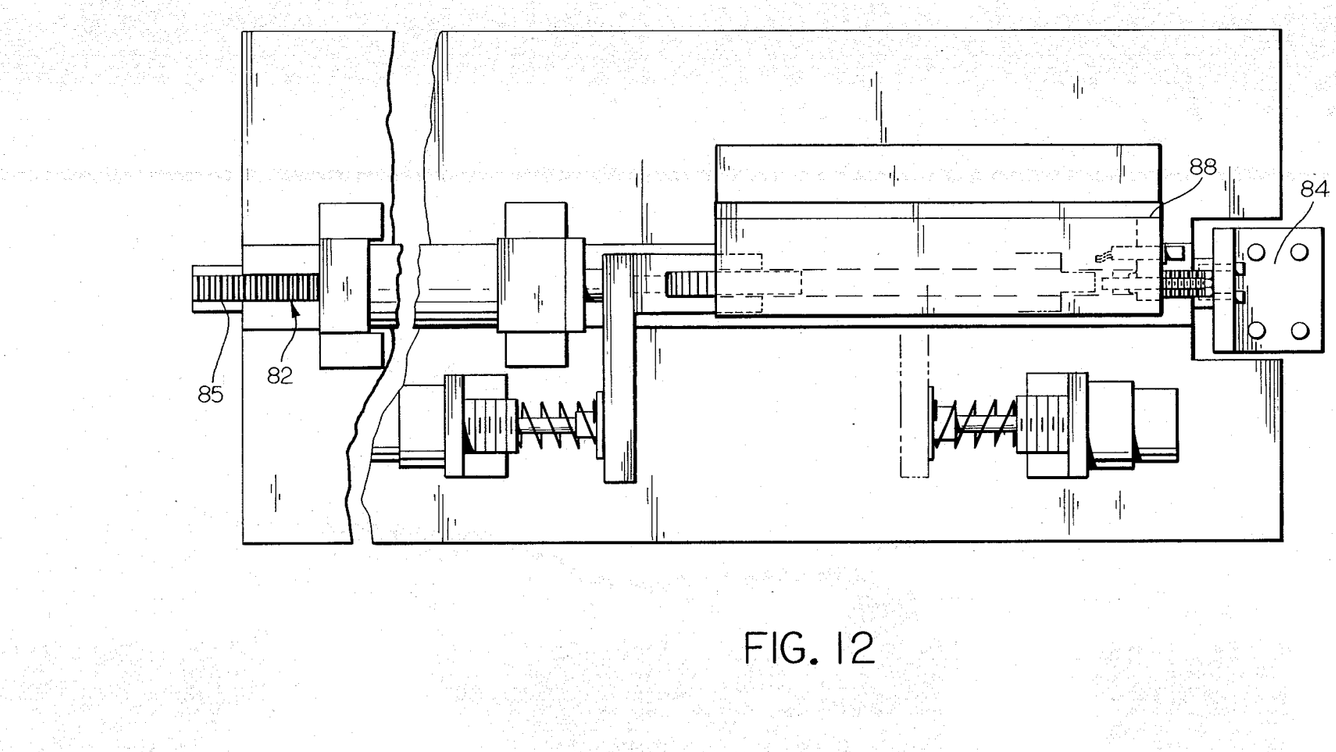
FIG. 12 is a fragmentary plan view of a portion of the apparatus shown in FIG. 11.

Referring to FIG. 9, each mandrel 27 comprises a cylinder which has a longitudinally extending opening 56 and is removably mounted by threaded connection 57 on the end of a shaft 58. The mandrel 27 includes spaced longitudinally extending slots 58 which are connected by radial openings 59 to associated longitudinally extending openings 60, each of which opens at the end opposite the open end to a vacuum chamber provided in a collar 62 that is mounted on spaced shafts 63 fixed on a body 64. Springs 65 yieldingly urge the manifold 62 against the end of the mandrel 27. Vacuum is applied to the chamber 61 through a tubular connection 66.

As shown in FIG. 10, as the mandrel rotates and the vacuum conveyor 28 is moved, the leading edge of a label L registers with one of the slots 58 so that as the mandrel is then rotated, the trailing edge of the label is engaged by the other slot 58 to hold the label in position. The indexing and registry of the mandrel and conveyor is maintained, as presently described.

Figure 13:
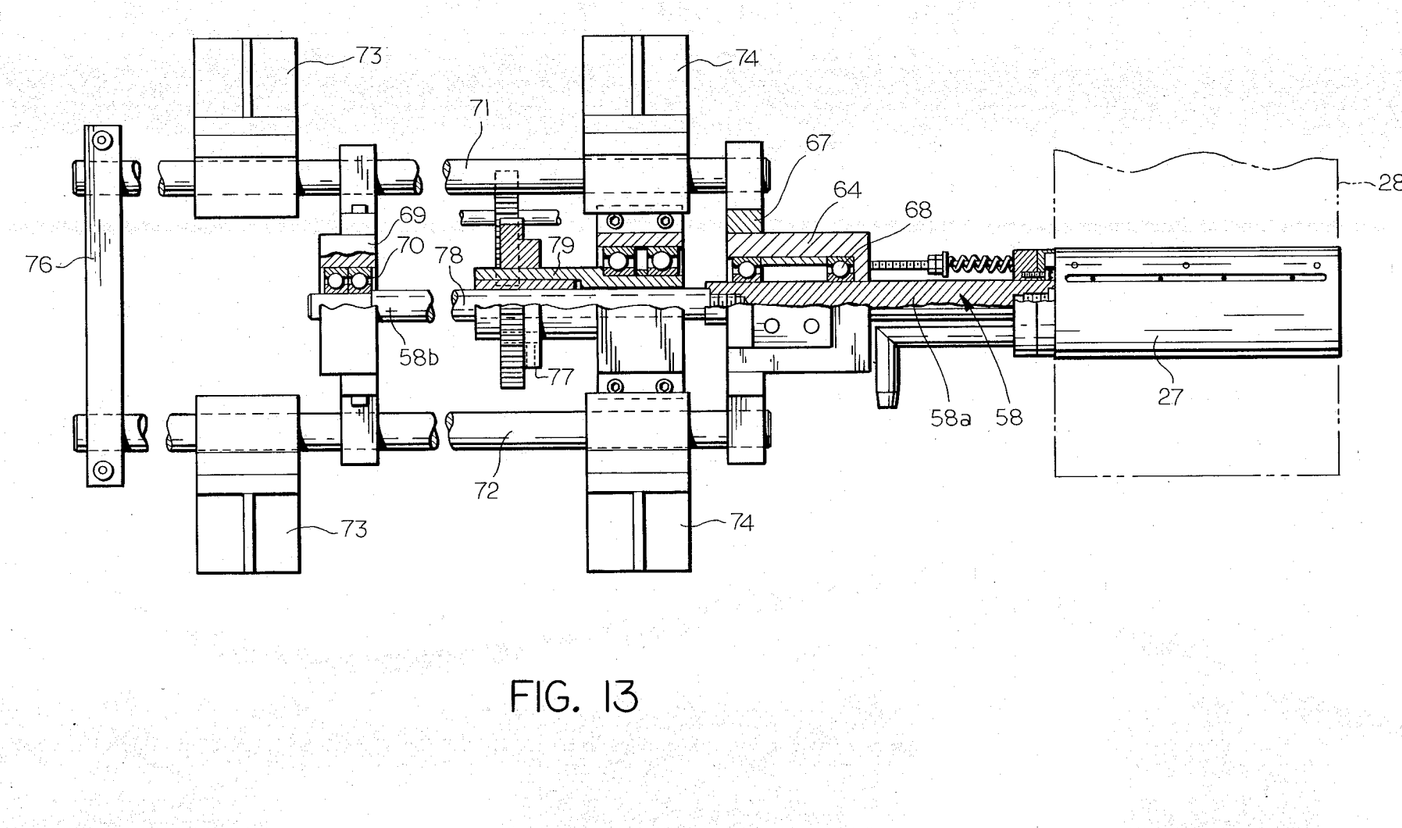
FIG. 13 is a fragmentary part sectional view on an enlarged scale of the portion of the apparatus shown in FIG. 3.
Figure 14:
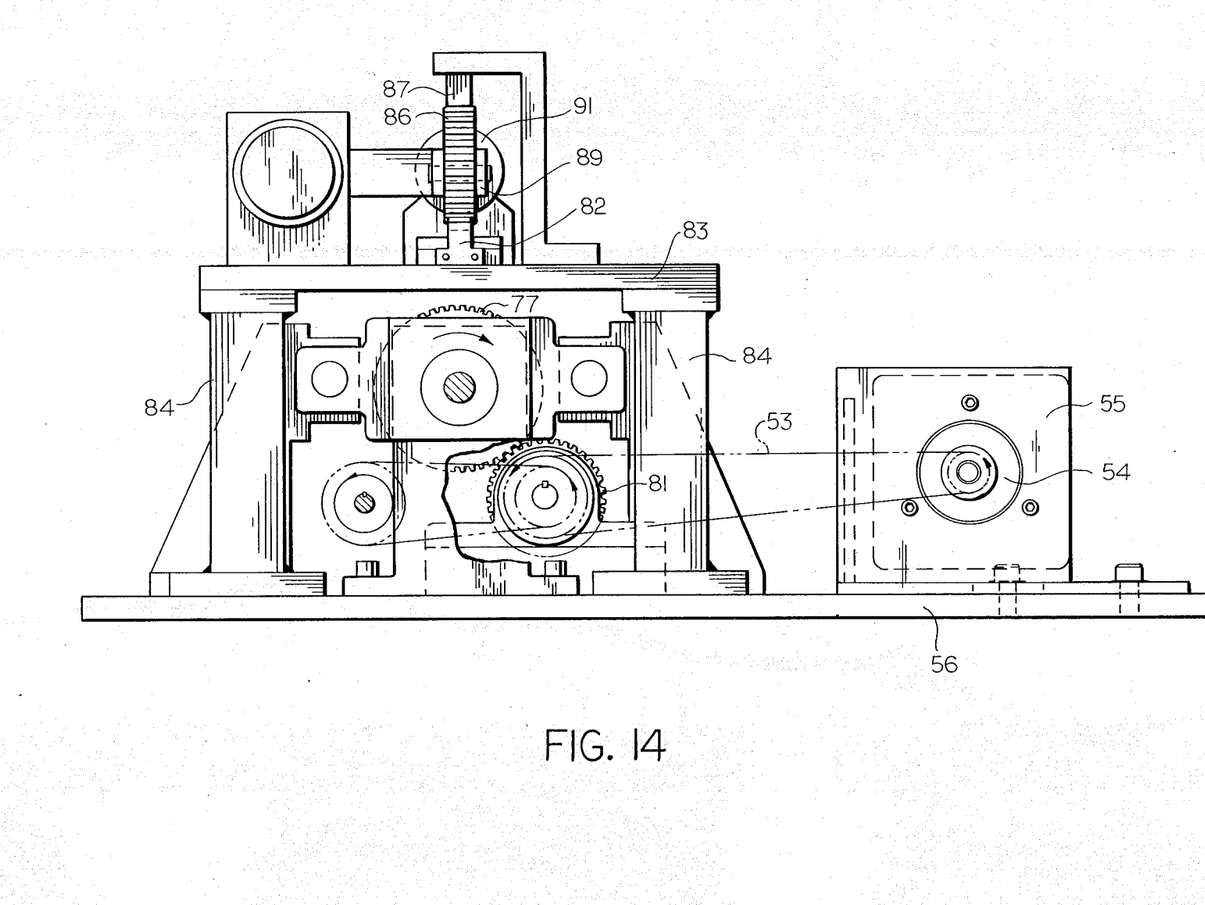
FIG. 14 is a sectional view taken along the line 14—14 in FIG. 11.

Referring to FIG. 13, the shaft 58 on which the mandrel 27 is mounted comprises rotatably mounted in a first bracket 67 by bearing 68 and the portion 58b is rotatably mounted in a second bracket 69 by bearing 70. Brackets 67, 69 are adjustably mounted longitudinally on rods 71, 72. The rods 71, 72 are in turn mounted on spaced brackets 73, 74 mounted on plate 56. The ends of the rods 71, 72 are interconnected by a bracket 76 that spans the ends.

In this manner, the rod 58 is reciprocable between a position overlying the conveyor and a position wherein the mandrel is within a blow mold.

A gear 77 is mounted on the portion 58b of shaft 58 and is interconnected thereto by a key 78 extending into an elongated keyway 79 so that the shaft can be rotated by rotation of the gear 77 and maintains such rotation during reciprocation of the shaft 58. The gear is in turn rotatably mounted by sleeve 79 and bearings 80 on brackets 74. Gear 77 meshes with a gear 81 on the shaft 51 (FIG. 2).

Reciprocation of the shaft 58 and associated mandrel is achieved by a drive wherein a rack 82 is mounted on a plate 83 supported by post 84 above the plate 56 and is guided for longitudinal reciprocation parallel to the shaft 58. The end of the rack 82 is connected to a bracket 84 on the block 64 which is mounted on the bracket 67. The rack 82 is formed with upwardly facing longitudinally spaced teeth 85 which are engaged by a gear 86. The gear 86 also engages a second rack 87 having longitudinally spaced teeth and supported in fixed position on the plate 83 by housing 88. The gear 86 is fixed on a bifurcated bracket 89 mounted on the system 90 of a linear motor 91 so that upon reciprocation of the shaft 90, the gear 86 racks along the rack 87 to translate the rack longitudinally and in turn move the shaft 58 and associated mandrel longitudinally between the position overlying the conveyor 28 and position within the blow mold.

In a typical sequence, the following steps occur:
1. Molds closed, bottom plate open, labels on conveyor, mold vacuum on;
2. Index vacuum transfer conveyor, vacuum on;
3. Left vacuum transfer conveyor;
4. Rotate mandrel, vacuum on and simultaneously index conveyor, vacuum off to transfer a label from the conveyor to the mandrel;
5. Lower vacuum transfer conveyor, vacuum on;
6. Insert mandrel with label into mold;
7. Blow off label into mold;
8. Retract mandrel;
9. Index mandrel to original position;
10. Close mold bottom plate;
11. Blow container;
12. Open mold and remove container.

Figure 15:
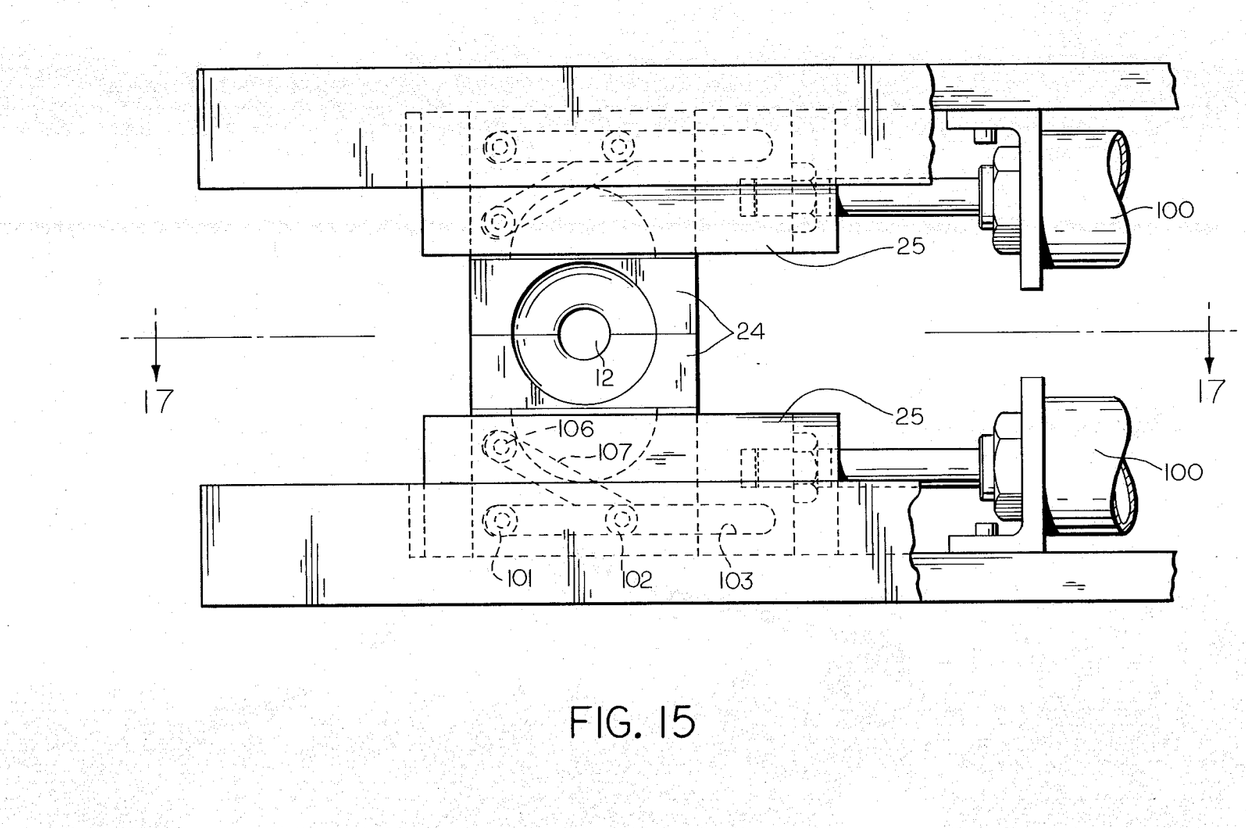
FIG. 15 is a fragmentary view taken along the line 15—15 in FIG. 3.
Figure 16:
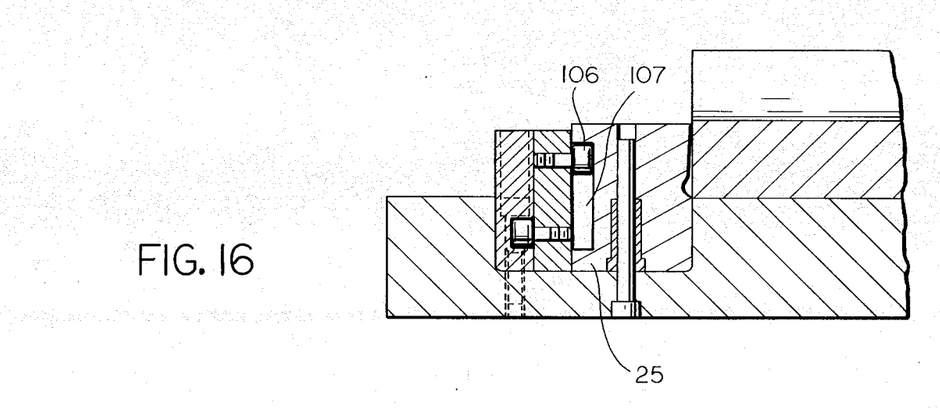
FIG. 16 is a fragmentary view taken along the line 16—16 in FIG. 15.
Figure 17:
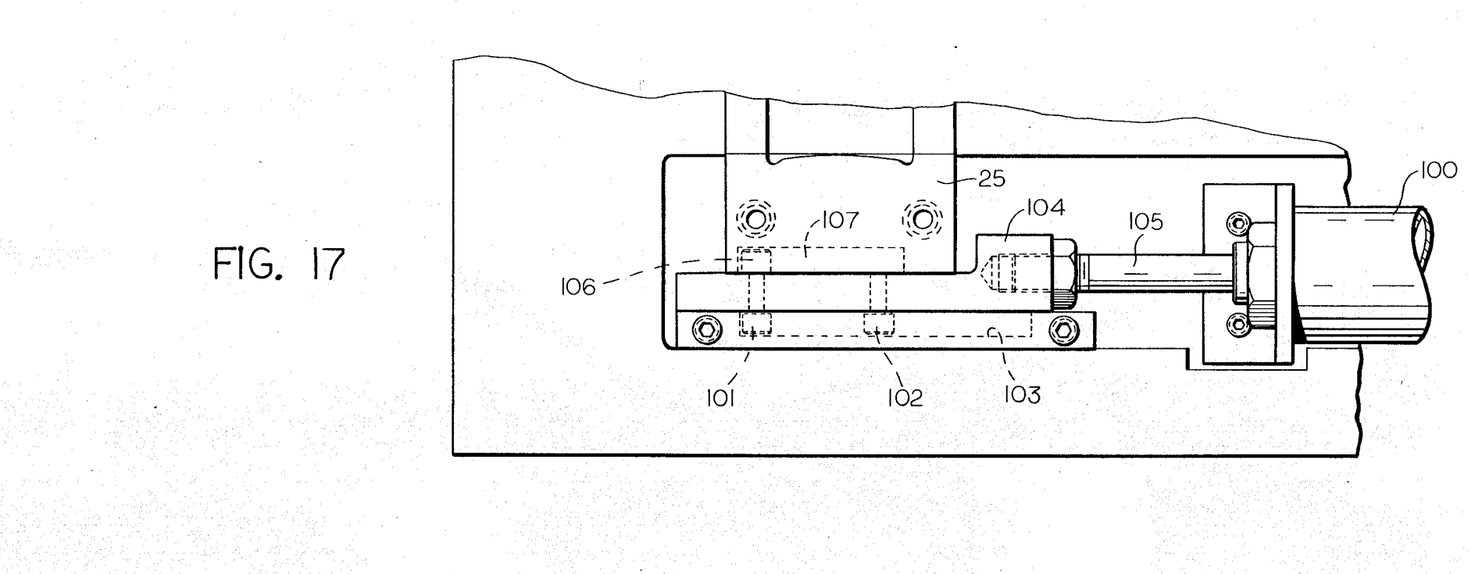
FIG. 17 is a fragmentary view taken along the line 17—17.

Referring to FIGS. 15–17, the apparatus for moving the bottom plates 25 into and out of position for closing the open end of the blow mold comprises a cylinder 100 associated with each plate. The plate 25 is mounted for movement and is guided by cam rollers 101, 102 operating in a longitudinally extending track 103 and mounted on a operating plate 104 fixed to the shaft 105 of the cylinder 101. Operating plate 104 further includes a cam roller 106 that engages an angularly extending slot 107 in the bottom plate 25. Upon reciprocation of the shaft 105, the operating plate 104 moves along the track 103 and causes the roller 106 to shift the bottom plate 25 radially of the mold sections 24 to bring the bottom plates into overlying relation with the ends of the mold sections 24 thereby closing the bottom. After the vacuum plunger 27 has deposited a label within the open ended blow mold 24.

In operation, the positioning apparatus 26 moves a label L to a position in registry with the mandrel 27 which is in overlying relationship to the vacuum belt 28. The end of the associated blow mold is open and the core rod 12 is within the mold with a parison P thereon. The positioning apparatus 26 is tilted upwardly bringing the label into registry with the mandrel so that rotation of the mandrel will wrap the label about the mandrel after which the mandrel is moved longitudinally within the mold, the vacuum is disconnected, and the label is thereby released within the mold. The bottom plates are then closed and the blow molding can then proceed to blow the parison into a container C with the label adhered to the outer surface of the container C.

Figure 20:
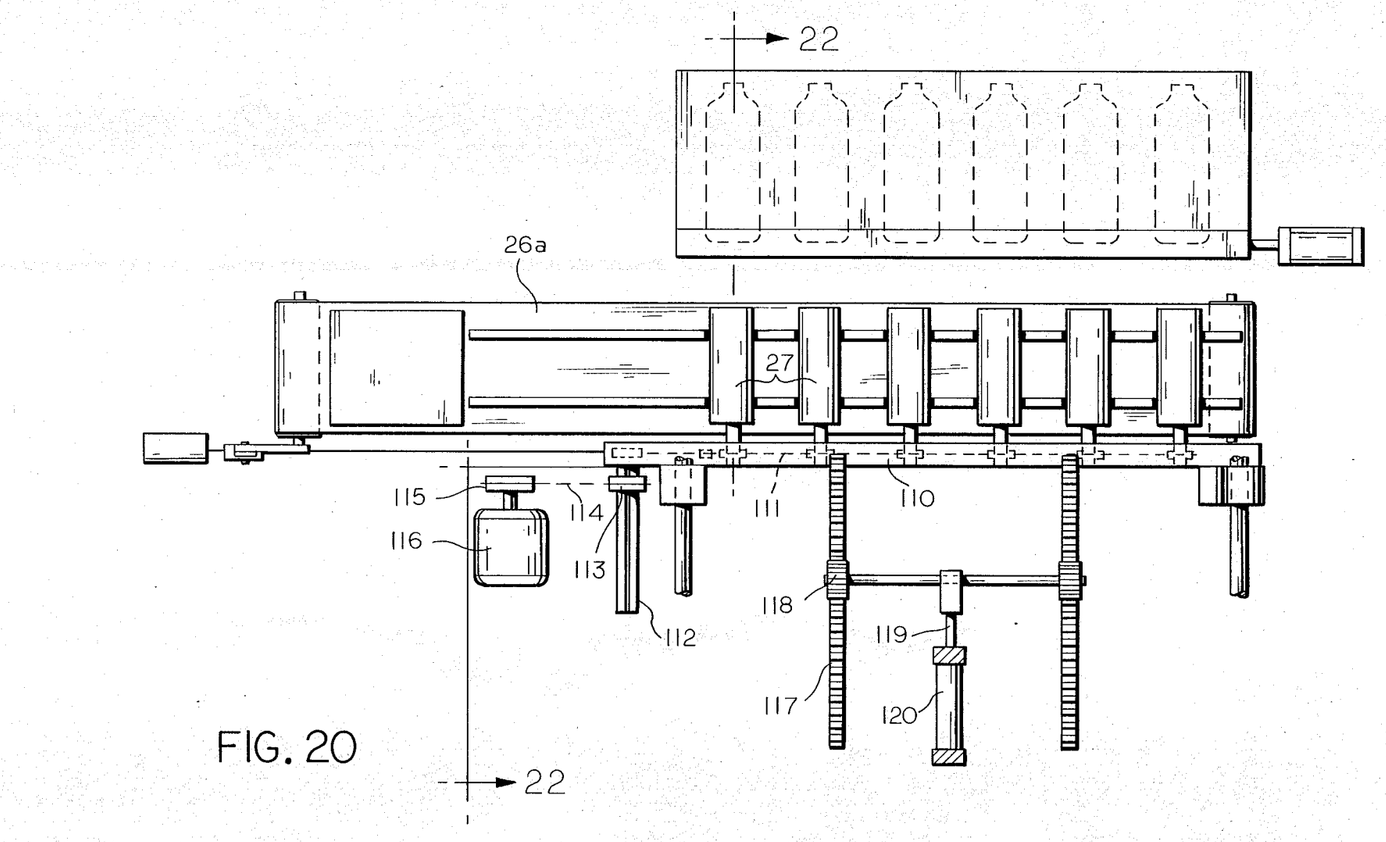
FIG. 20 is a plan view of a modified form of apparatus.
Figure 21:
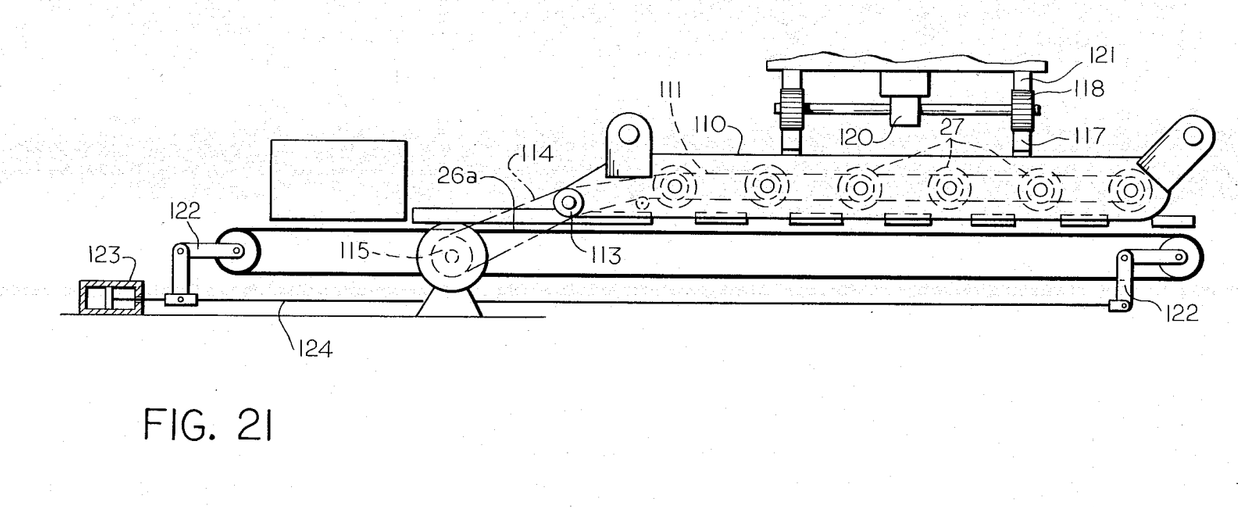
FIG. 21 is a front elevational view of the apparatus shown in FIG. 20.
Figure 22:
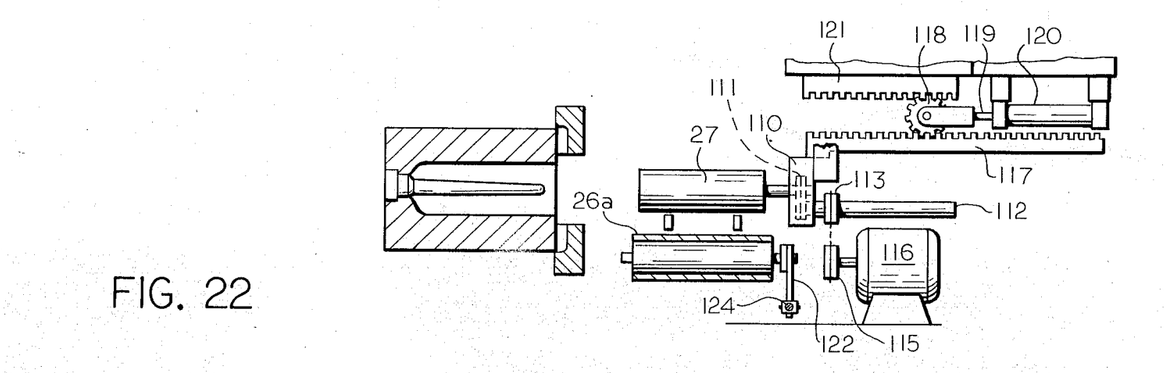
FIG. 22 is a fragmentary sectional view taken along the line 22—22 in FIG. 20.

In the form of apparatus shown in FIGS. 20–22, a plurality of mandrels 27 are mounted for rotation on a support 110 and are interconnected by chains 111 to a splined drive shaft 112. The splined shaft 112 extends through a pulley 113 which, in turn, is driven through a belt 114 by a pulley 115 on motor 116 to rotate the mandrels 27 in accordance with the method and thereby pick up labels in unison from the positioning conveyor 26a. Support 110 is mounted for movement toward and away from the molds by an arrangement which includes a rack 117 on the support 110. A gear 118 is mounted on the shaft 119 of a linear actuator 120 and meshes with a fixed rack 121 so that upon actuation of the actuator 120, the mandrels can be driven in unison toward and away from the molds. Conveyor 26a is mounted on bell cranks 122 operated by motor 123 and connected by a rod 124 to raise the conveyor 26a to bring the labels into position for engagement with the mandrels.

It can thus be seen that there has been provided a method and apparatus for in-mold labeling in an injection blow molding machine wherein the in-mold labeling can be achieved without reducing the normal operating cycle and wherein the labels can be accurately positioned both longitudinally and circumferentially with respect to the parting line of the blow molds.

We claim:

1. A method of applying a label on a container which is made by injection molding a parison and thereafter blowing a parison to the confines of the mold which comprises, providing a mold which has an open end when closed about a core and having a parison thereon,
positioning a label adjacent the open end of the closed blow mold in which a core rod is positioned having a parison thereon,
wrapping the label about a vacuum mandrel,
inserting the vacuum mandrel with the label thereon into the open end of the closed mold,
releasing vacuum on the vacuum mandrel such that the label is released within the mold,
removing the mandrel from within the open end of the closed mold,
closing the end of the mold,
and blowing the parison outwardly to provide a container having a label thereon.

2. The method set forth in claim 1 including the step of blowing air through the vacuum mandrel while it is in the mold to blow the label outwardly against the mold.

3. The method set forth in claim 1 wherein the positioning of the label is achieved by utilizing a vacuum conveyor and rotating the mandrel while simultaneously moving the conveyor to transfer a label to the mandrel.

4. The method set forth in claim 3 including the step of moving the conveyor relative to the mandrel to bring the label adjacent the mandrel.

5. The method of in-mold labeling in an injection molding apparatus wherein the apparatus comprising a turret having plurality of circumferentially spaced surfaces, each of which supports a plurality of spaced core rods, a plurality of injection molds at a injection molding station for forming a plurality of preforms, and a plurality of blow mold sections at a blow molding station which close about the preforms so that the preforms can be blown outwardly against the confines of the mold to form hollow plastic articles comprising the steps of providing a movable base on each said mold,
positioning a label adjacent the open end of the closed blow mold in which a core rod is positioned having a parison thereon,
wrapping the label about a vacuum mandrel,
inserting the vacuum mandrel with the label thereon into the open end of the closed mold,
releasing vacuum on the vacuum mandrel such that the label is released within the mold,
removing the mandrel from within the open end of the closed mold,
closing the end of the mold by moving the base,
and blowing the parison outwardly to provide a container having a label thereon.

6. The method set forth in claim 5 including the step of blowing air through the vacuum mandrel while it is in the mold to blow the label outwardly against the mold.

7. The method set forth in claim 5 wherein the positioning of the label is achieved by utilizing a vacuum conveyor and rotating the mandrel while simultaneously moving the conveyor to transfer a label to the mandrel.

8. The method set forth in claim 7 including the step of moving the conveyor relative to the mandrel to bring the label adjacent the mandrel.

9. In an injection molding apparatus comprising a turret having plurality of circumferentially spaced surfaces, each of which supports a plurality of spaced core rods, a plurality of injection molds at a injection molding station for forming a plurality of preforms, and a plurality of blow mold sections at a blow molding station which close about the preforms so that the preforms can be blown outwardly against the confines of the mold to form hollow plastic articles, an in-mold labeling apparatus comprising a movable base for closing the ends of the molds,
means for moving said base,
a vacuum conveyor for positioning a series of labels adjacent each mold,
a vacuum mandrel mounted for rotational movement and axial movement adjacent each said mold,
means for rotating and axially moving said vacuum mandrels simultaneously,
such that the mandrels can be rotated to pick up a plurality of labels from the conveyor and moved axially into the open end of the closed molds to deliver a label to each mold.

10. The in-mold labeling apparatus set forth in claim 9 including means for moving said conveyor toward and away from said mandrels.

11. The in-mold labeling apparatus set forth in claim 10 including means for rotating said mandrel and simultaneously moving said conveyor to transfer a label from said conveyor to said mandrel.

12. The in-mold labeling apparatus set forth in claim 11 wherein said mandrel includes a longitudinally extending slot for engaging a leading edge of a label on the conveyor.

13. The in-mold labeling apparatus set forth in claim 9 wherein said mandrel includes a longitudinally extending slot for engaging a leading edge of a label on the conveyor.

* * * * *